(12) United States Patent
Harper

(10) Patent No.: US 9,086,160 B2
(45) Date of Patent: Jul. 21, 2015

(54) BIFLEX FILM VALVES

(71) Applicant: William Anthony Harper, Redmond, WA (US)

(72) Inventor: William Anthony Harper, Redmond, WA (US)

( * ) Notice: Subject to any disclaimer, the term of this patent is extended or adjusted under 35 U.S.C. 154(b) by 26 days.

(21) Appl. No.: 13/815,947

(22) Filed: Mar. 18, 2013

(65) Prior Publication Data
US 2014/0271245 A1    Sep. 18, 2014

(51) Int. Cl.
*F16K 15/14*    (2006.01)
(52) U.S. Cl.
CPC .................................. *F16K 15/144* (2013.01)
(58) Field of Classification Search
CPC ............................... F16K 15/14; F16K 15/144
USPC .......... 137/843, 852, 855, 856, 858, 517–521
See application file for complete search history.

(56) References Cited

U.S. PATENT DOCUMENTS

| 3,295,547 | A | * | 1/1967 | Scaramucci | 137/315.33 |
| 3,473,561 | A | * | 10/1969 | Svenson et al. | 137/854 |
| 4,708,167 | A | * | 11/1987 | Koyanagi | 137/512.15 |
| 4,966,197 | A | | 10/1990 | Jaron | |
| 5,144,986 | A | | 9/1992 | Drew | |
| 5,209,264 | A | | 5/1993 | Koyanagi | |
| 5,755,263 | A | | 5/1998 | Jang | |
| 5,881,772 | A | | 3/1999 | Bennett | |
| 6,253,788 | B1 | * | 7/2001 | Palvolgyi | 137/512.1 |
| 6,810,914 | B2 | | 11/2004 | Persson | |
| 8,360,106 | B2 | | 1/2013 | Harper | |
| 8,608,464 | B2 | * | 12/2013 | Borst et al. | 417/559 |
| 2007/0175522 | A1 | | 8/2007 | Chen | |
| 2011/0211974 | A1 | * | 9/2011 | Harper | 417/53 |

FOREIGN PATENT DOCUMENTS

WO    WO 2010124798 A1 *  11/2010

* cited by examiner

*Primary Examiner* — John K Fristoe, Jr.
*Assistant Examiner* — Jessica Cahill

(57) ABSTRACT

Disclosed is a one-way valve characterized as a new form of check valve wherein an affixed free moving film device, downstream edge control techniques, a channel surface and the motive force of directional pressurized fluid flows cooperatively permit forward fluid flow yet check reverse fluid backflow through the valve assemblage to achieve a unidirectional flow.

26 Claims, 6 Drawing Sheets

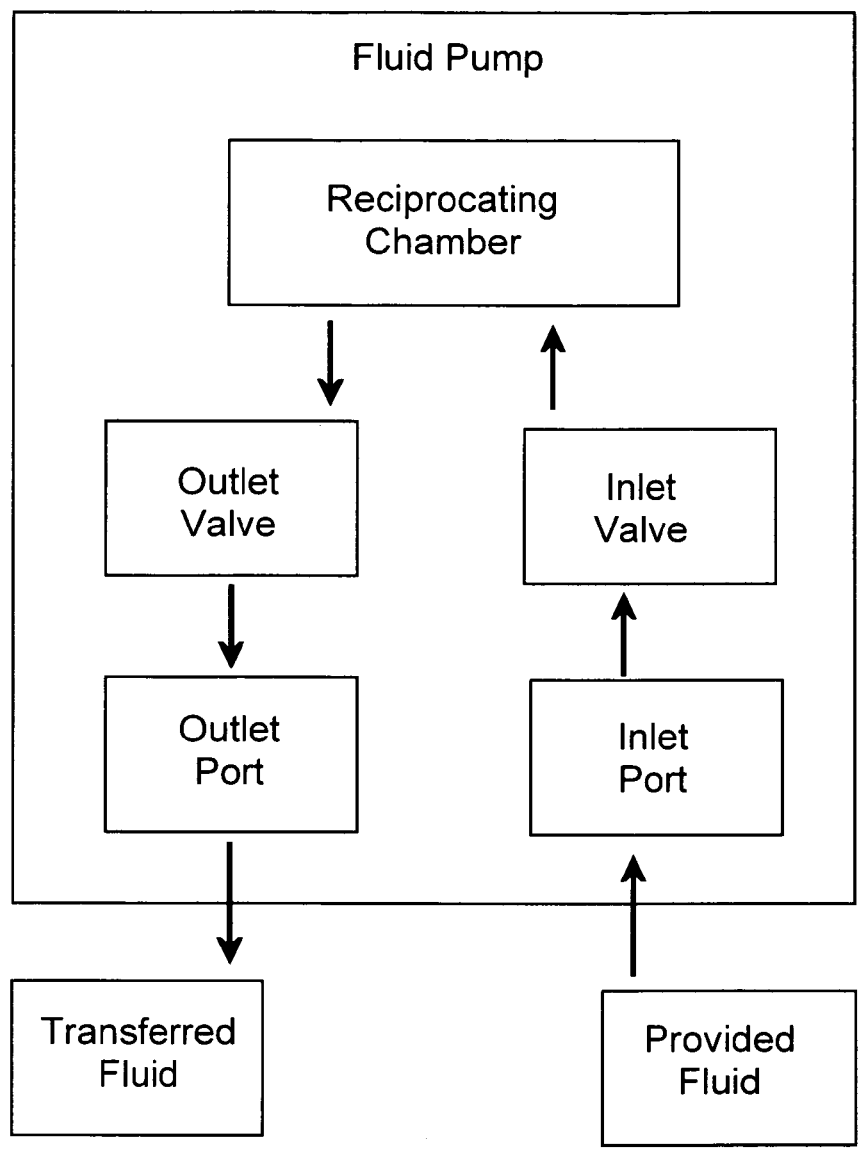

BIFLEX FILM VALVES

FIELD OF THE INVENTION

This invention relates to the field of controlling fluid flow by mechanical devices known as check valves. More specifically the invention comprises a one-way valve assemblage wherein an affixed biflexing flexible film device with a downstream edge control means and a reciprocal channel surface work cooperatively to permit forward fluid flow downstream yet check reverse fluid flow as backflow.

BACKGROUND OF THE INVENTION

Valve control of fluid flow, both gases and liquids, is an old and well populated art. Numerous styles of soft check valves are known, the following are representative of the current art. Collectively, arranged chronologically, each with a short description, they provide in their entireties a useful background for understanding the new teachings to the art taught by the description of biflex film valves provided herein. Being cited, each therefore is fully incorporated herein as a pertinent teaching.

Jaron, U.S. Pat. No. 4,966,197 (1990), "One-way Valve" is a form of flattened duckbill design where two resilient chamber walls define a tortuous pathway channel through which fluid flows. Such designs attempt to offered little resistance to forward flow, require a designated cracking pressure to open and are simple to fabricate. In these design there is neither a suggestion nor use of a separate affixed flexible film device nor need for such a film device to close the pathway by means of pressurized backflow fluid. Such designs may find beneficial use for some low pressure medical applications.

Drew, U.S. Pat. No. 5,144,986 (1992), "One Way Flow Device" describes a class of simple film valves sometimes seen in novelties such as balloons. Drew teaches film devices where all ends and sides are attached to the sides of a fluid channel so as to allow only flow through a hole in a flexing film. The film has sufficient longitudinal movement so that when flow is in a forward direction it moves the hole to the channel center allowing forward fluid flow but when flow is reversed the film with the hole is pushed against a channel wall and effectively blocks passage of backflow fluid through the hole in the upstream direction. Due to the restrictive nature of the device hole as the only flow passage, clogging and poor seals are common with this design.

Koyanagi, U.S. Pat. No. 5,209,264 (1993), "Check Valve" is a flat film valve designed to vent air and outgases from sealed rice bags. A check flap under structured tension positions the flap normally closed to backflow. There is neither a recognized need for nor use of any control means for positioning a downstream edge of the check flap to seal off the backflow of ambient air. It is a problematic design that frequently fails to effectively prevent air backflow when the uncontrolled flap does not respond as hoped but remains open when the flap sticks to a wall or moves by chance in the wrong direction due to the absence of any edge control means.

Jang, U.S. Pat. No. 5,755,263 (1998), "Backward Flow Prevention Device" describes a variation of a duckbill design best described as a windsock duckbill. A truncated cone of flexible material is mounted on a pipe outlet, the pipe having side holes as fluid outlets. This windsock tube trails off downstream in the channel, guiding all flow from the outlet holes to the far end of the cone where it emerges back into the channel. When reverse backflow occurs the sock collapses, bunched up on itself and at off-angle to the pipe thereby preventing the backflow from entering the outlet holes. Such a construct is representative of several valve designs offering low friction loss expressed as flow resistance to forward movement but block reverse backflow fluid movement effectively if somewhat unpredictably.

Bennett, U.S. Pat. No. 5,881,772 (1999), "Smiling Duckbill Valve" is a curved lipped form of duckbill valves where tension compresses the walls of an elastomeric cylindrical valve body causing the lips to seal in a smile-like characterization reminiscent of ancient Greek play masks. There is no suggestion or use of any edge control means nor use of a non-tensioned film device in this design that effectively uses an internally structured spring to close the valve to backflow and imposes a significant threshold opening pressure head loss as well as an operational loss.

Persson, U.S. Pat. No. 6,810,914 (2004), "Method and Arrangement to Accomplish a One-Way Flow" describes a plastic bag deployed in a sewer pipe to prevent backflow while offering minimal interference to continuous sewage outflow. Noting that swinging iron gates and like devices impede flow and often result in disastrous blockage, a flexible elastic bag partially glued to the pipe wall is designed to flatten against the pipe wall during outflow thereby offering minimal resistance but deploys to open and fill with backflow fluid to temporarily block the sewer when reverse flow occurs. There is no suggestion or use of any edge control means nor use of a neutral tensioned film device, the bag having an inherent elasticity spring to maintain a normally closed aspect. It is doubtful the bag could survive the harsh conditions of sewer flow and sewage content, successfully deploy as contemplated, and avoid creating the very blockages it is designed to alleviate.

Chen, U.S. Pat. No. 7,201,273 (2007), "Air Packing Bag Having Film Type Check Valves" describes where two or more flexible films create fluid passages between the film layers which collapse and block off these passages when flow is reversed. Essentially the same mechanism described for the Jang windsock varying only in its use of flat film instead of a conical form. There is no recognition of a need for any edge control means or a descriptive use of a channel surface by a film device to enable fluid passage blockage.

Harper, U.S. Pat. No. 8,360,106 (2013), "Curved Pliant Film Valves" are a form of one-way valves where a pliant film device motivated by a compressible spring establishes a minimal resistant threshold pressure requirement to open a fluid channel to forward fluid movement and closes to prevent any reverse backflow of fluid through the same channel at any pressure. Curved pliant film (cpf) valves do not employ or recognize the need for any form of downstream edge control means, do employ a spring tension to control film device movement and do impose resistive threshold pressures to operate in forward flow mode. Cpf check valves are easily distinguished from biflex film valves as described herein by their use of springs to position their flexible film devices to prevent backflow. Cpf valves inherent use of threshold pressure to control forward pressure movement precludes their use in applications where film valves designs require little or no pressure resistance to open and operate.

None of these disclosures individually or in aggregate either describe, suggest or even recognize the need for a particularly low-cost, reliable, disposable, minimal component, securely sealing one-way valve action offering a design for effective film edge control that is easy to manufacture. The need for such a securely sealing one-way valve employing a pressure motivated film device with effective downstream edge control of reliable and of economical design has yet to be met.

SUMMARY OF THE INVENTION

The present invention of the biflex valve recognizes the abundance of prior art and contributes a specific advancement over that same art. Accordingly it is the particular intent of the present invention to provide a simple one-way valve assemblage effectively offering no resistance to positive forward pressurized flow and closed to reverse pressurized backflow, each alternative state achieved by means of pressure controlled movement of the free downstream edge of an affixed flexible film device so as to block the fluid channel by a sealing arrangement of the film device and channel wall of the biflex valve. Further, the flexible film device of the biflex valve is solely motivated to move by the effect of directional pressurized fluid flow thru the biflex valve and specifically the control by design means employed to manipulate the free downstream edge of the affixed film device. In aggregate a biflex valve consists of four principle components assembled to control fluid flow. First, a fluid passage formed by interior channel surfaces capable of both containing and guiding a flowable material like water, air and any such characteristically flowable material herein collectively described as fluids. Second, a flexible film device constructed from such as a flexible polymer film with the ability to closely conform to surfaces of the channel wall and arranged in such a manner so as to be capable of extending along and across the passage in a manner sufficient to alternatively be moved to open and block a fluid channel. Third, various attachment means capable of affixing portions of the flexible film device in the fluid passage so that a fluid channel is formed which guides all flowable material between the film device and the interior surface of the channel wall. And fourth, a means to control movement of the free floating downstream edge of the film device so that when acted upon by forward fluid flow the edge and the top surface of the film device move away from the channel wall surface creating an open fluid channel for passage of pressurized forward flowable material in a downstream direction yet when the same downstream edge is moved by pressurized backflow fluid the edge and top surface of the film device are pushed into sealing contact with portions of the channel wall surface thereby blocking the fluid channel to passage of backflow fluid moving upstream. Critical to the success of this design is effective movement control of the downstream edge of the film device in response to backflow pressure so as to move only in the direction and manner necessary to block the fluid channel. Five representative examples of means for downstream edge control that have proven useful to achieve this means of channel blockage guidance are the channel wall convex form, the channel wall concave form, the asymmetric alignment form, the edge wave form, and the device restraint form. By assembling the four components, arranged and managed by at least one of these five downstream edge control means in the new and novel manner as taught herein by the details of five examples provided, the present invention of the biflex valve represents a genuine enrichment of the art.

Specifically, the biflex teachings disclosed herein are keyed to a new check valve exhibiting the twin attributes of opening for forward one-way flow while closing off reverse backflow and a means to automatically switch between open and closed states dependent on the direction of pressurized fluid flow. These attributes are represented in the prior art by the likes of simple reed valves blocking holes and the cpf valve spring loaded pliant film seals conforming to a curved surface, both achieve automatic switching between open and closed states depending on the direction of the fluid flow. As newly taught herein the biflex art discloses how these twin attributes are met by a film device employing a novel downstream edge control means capable of automatically responding to directional pressurized fluid movement to open and close a fluid channel. Use of this film device and its control means permits improved value designs which present flatter lateral aspects, use less material, are simpler to manufacture, are of significantly smaller size, provide minimal valve imposed fluid friction losses, eliminate head pressure thresholds and afford by these features opportunities to build more useful and improved products such as fluid dispensing packs, pouches, and bottles together with applications in such as pumps, medical devices, micro machines and inline vascular valve technologies.

It is therefore the principle object of the present invention to provide an automatic one-way fluid valve which opens to forward pressurized flow and closes to all pressurized fluid backflow, each flow movement providing the motive force governing a switching downstream edge control means operating an incorporated flexible film device.

A specific object of this invention is to provide a biflex valve which is of such few parts and simple design as to be readily adaptable to a straight forward and economical manufacturing process.

Another object of the present invention is to create a one-way valve of such minimal weight, size and reliable design that it promotes widespread and convenient product usage while conserving material even though often used in disposable applications.

Another object of the present invention is to provide a valve design which offers effectively little or no friction loss represented by pressure overhead imposed by the valve itself.

Another object of the present invention is to create a valve with a laterally and/or longitudinal flat aspect which permits the design and construction of compact, pocketable, multi-dose packets and pouches used for the dispensing of fluids.

Another object of the present invention is to provide simple, economical, and reliable inlet and/or outlet valves for use in pumps and other devices capable of propelling and/or controlling fluid movement.

Another object of the present invention is to create a valve which by its unique design alleviates constricted flow through the valve by providing increased cross-sectional area and volume at the point of control.

Another object of the present invention is to teach several representative means of downstream edge movement control of the film device that respond to the motive force provided by directional pressurized fluid movement.

Another object of the present invention is to create a valve capable of sustaining negative upstream pressure to achieve related functional objectives made possible by biflex valve design.

These and other objects and advantages of the present invention will become apparent from the following description taken in conjunction where appropriate with the accompanying drawings wherein are set forth, by way of illustrations and example, certain embodiments of this invention. The drawings constitute a part of this specification and include exemplary embodiments of the present invention and illustrate various objects and features thereof.

BRIEF DESCRIPTION OF THE DRAWINGS

The invention is best understood and objectives even beyond those already cited will become apparent when consideration is given to the following detailed illustrations thereof. Such descriptive specificity makes reference to the annexed drawings wherein:

FIG. 25 shows a schematic pump with reciprocating chamber and inlet/outlet valves for fluid transfer.

DETAILED DESCRIPTION OF THE INVENTION

While the invention will be described in connection with illustrations, descriptions, and examples of preferred embodiments, it will be understood these are not intended to limit the present invention only to these embodiments. On the contrary, the present invention is to cover all structural and/or functional alternatives as generally described.

The key feature of the present invention, the downstream edge control means of the biflex valve, is best understood by five examples of functional designs that illustrate how edge control operates. Each of these five forms is an example of a single expressed means of edge control of an affixed film device in a biflex check valve which to date has been an unrecognized need and consequently an unaddressed issue in flexible check valve design. Five examples of these forms are herein described in some detail; each of these forms is descriptively named convex, concave, asymmetric, wave and restraint. Each form employs a specific and unique physical design component that enables movement and controls the downstream edge of a flexible film device to achieve fluid control common in a biflex valve. While each form employs a unique arrangement of physical components, they each are simply five examples of a single function described as the downstream edge control means for operating the film device which opens and closes the fluid channel of a biflex check valve.

Convex Form Example

Figure 1:
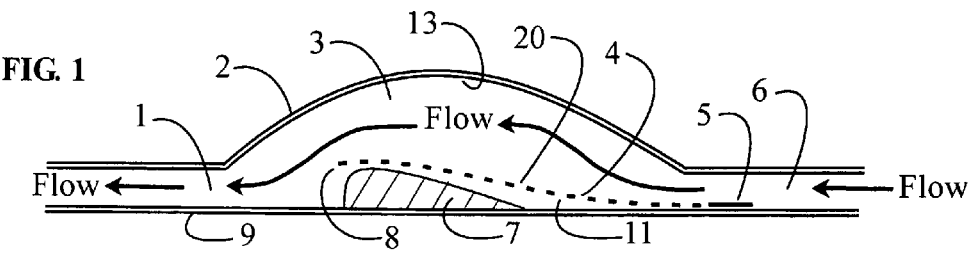
FIG. 1 is a longitudinal side view showing the relationship of an open fluid channel conducting fluid flow between the upper channel surface and the flexible film device (dashes) with a convex form as a means of film device edge control.

In FIG. 1 a longitudinal side view shows an upper channel wall 2 and a flexible device 20 defining a fluid channel 3 thru which a fluid flows from an upstream channel 6 thru the fluid channel 3 and out the downstream channel 1. The downstream channel 1, upstream channel 6 and the fluid channel 3 are enclosed by the upper channel wall 2 and lower channel wall 9. These channel walls 2/9 define a channel wall surface 13 that taken as a whole provides the firm support body of the valve through which the fluid flows. The upper channel walls 2 and lower channel wall 9 are shown as being curved and/or flat as dictated by design considerations. Located in the fluid passage as defined by the channel walls there is a flexible film device 20 comprised of a top surface 4 and bottom surface 11 with a downstream edge 8 and an upstream edge 5 (the downstream edge 8 illustrated by the end of the dashed line is in open position). The downstream edge 8 of the film device 20 is unfixed to allow free floating movement as affected by the motive force of pressurized fluid while the upstream edge 5 is shown fixed to a portion of the channel wall surface 13 as defined here by the lower channel wall 9. A convex form 7 provides the means for downstream edge control. A convex form 7 protruding in a convex manner from the channel wall 9 is shown holding off a portion of the film device 20, specifically the downstream edge 8 bottom, from contact with the lower channel wall 9 as pressurized fluid flows forward unimpeded from the upstream channel 6, through the fluid channel 3 formed between the channel wall surface 13 and the top surface 4 of the film device 20, and out through the downstream channel 1. This forward flow is created and maintained by greater fluid pressure in the upstream channel 6 compared to the downstream channel 1. This pressurized flow also acts as the motive force necessary to push the downstream edge 8 and top surface 4 of the affixed film device 20 toward the channel wall 9 to open the fluid channel 3 to the greatest extent possible.

Figure 2:
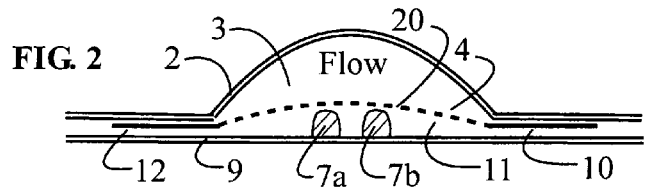
FIG. 2 is a lateral cross sectional view after FIG. 1 showing the open fluid channel created by forward fluid flow between the upper channel surface and a film device (dashes) with convex ridges shown as a means of film device edge control.

In FIG. 2 a lateral cross sectional view after FIG. 1 shows the open fluid channel 3 with fluid flow between the upper channel wall 2 and the top surface 4 of the film device 20. The side edges 10/12 of the film device 20 are attached to the channel walls 2/9 as representatively depicted here by being mechanically gripped as an attachment means between the upper channel wall 2 and lower channel wall 9 structures. Two convexities characterized as bumps 7a/7b or ridges extend from the channel wall 9 to prevent portions of the downstream edge 8 bottom and bottom surface 11 of the film device 20 from contact with the surface of the lower channel wall 9. The bump or bumps 7a/7b specific purpose is to allow pressurized fluid access to and from the free moving bottom of edge 8 and surface 11 of the film device 20.

Figure 3:
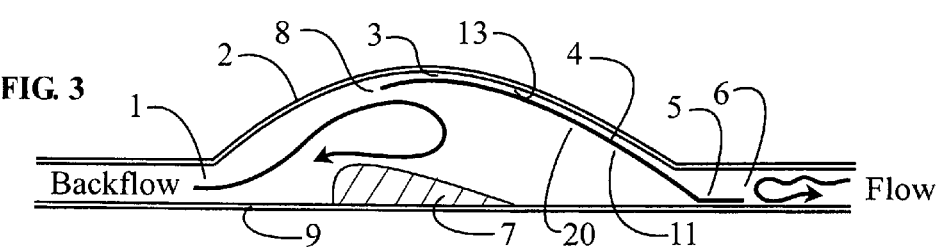
FIG. 3 is a longitudinal side view showing the closed fluid channel when film device (solid) has seated with upper channel wall when downstream edge has moved up to seal fluid channel due to convex ridges control of backflow fluid motive forces.

In FIG. 3 a longitudinal side view shows the same arrangement of components as FIG. 1 except the pressurized fluid flow has reversed to become backflow. Now the pressure of backflow fluid in the downstream channel 1 is greater than the fluid pressure in the upstream channel 6 causing the backflow fluid to attempt moving upstream through the fluid channel 3. This pressurized backflow fluid movement is allowed access to the bottom of the downstream edge 8 and subsequently the bottom surface 11 of the film device 20 because the convex form 7 extending from the channel wall 9 prevents the free moving downstream edge 8 bottom from making a full and sealing contact with the lower channel wall 9 surface. The convex form 7 is a downstream edge 8 control means capable of effectively preventing a portion of the downstream edge 8 bottom together with a portion of the bottom surface 11 from contact with and effectively fully conforming to the bottom channel surface 13. As the other three edges of the film device 20 (the side edges 10/12 and upstream edge 5) are fixed by attachment means to the channel walls 2/9 only the free floating unattached downstream edge 8 bottom is allowed to move in response to motive force of the pressurized backflow fluid flow which it does as the downstream edge 8 is moved by the direction of the backflow fluid flow where the pressure on the bottom surface 11 exceeds that on the top surface 4 of the film device 20. By initially controlling the downstream edge 8 by means of a convex form 7 the free moving film device is moved by pressurized backflow fluid to establish sealing contact with the channel wall surface 13 so as to close and thus block the fluid channel 3 to backflow fluid movement into the upstream channel 6 when fluid pressure is greater in the downstream channel 1. This blocked and sealed condition continues as long as the pressure of fluid in the downstream channel 1 exceeds the pressure of fluid in the upstream channel 6.

Figure 4:
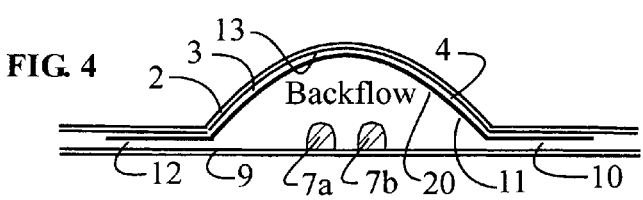
FIG. 4 is a lateral cross sectional view after FIG. 3 showing the closed fluid channel where the film device (solid) has sealed with upper channel surface.

In FIG. 4 a lateral cross sectional view after FIG. 3 shows the fluid channel closed by the top surface 4 of the film device 20 in sealing contact with the channel wall surface 13. Two channel wall 9 convex protrusions illustrated as bumps 7a/7b or ridges are shown without contact with the film device 20 which has been moved away by backflow fluid pressure and against a channel wall surface 13 in effective sealing contact.

Figure 5:
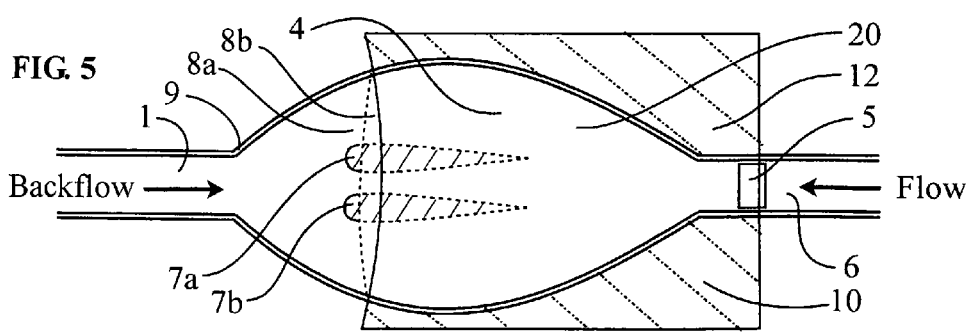
FIG. 5 is a top cross sectional view after FIGS. 1-4 showing the open location of the downstream edge of the film device (dashes) and it's the closed downstream edge (solid) position together with the relative locations of the convex ridges, fluid channel and fluid movement directions.

In FIG. 5 a top cross sectional view after FIGS. 1-4 shows an arrangement of the significant parts as they relate to one another. Shown are flow directions, the upstream 6 and downstream 1 channels, the placement and edge 10/12 position (hatched) fixing of the film device 20 and the convex ridge forms 7a/7b. Also shown is the downstream edge 8 of the top surface 4 (unhatched) in contact with fluid of the film device 20 within the fluid channel 3 shown in an open position 8a (dashes) and closed position 8b (solid) as it alternatively opens and closes (blocks) the fluid channel respectively. Opening and closing the fluid channel 3 is automatically governed by a downstream edge control means responding to the direction of pressurized fluid flow constitutes a method for operating a biflex check valve.

Concave Form Example

Figure 6:
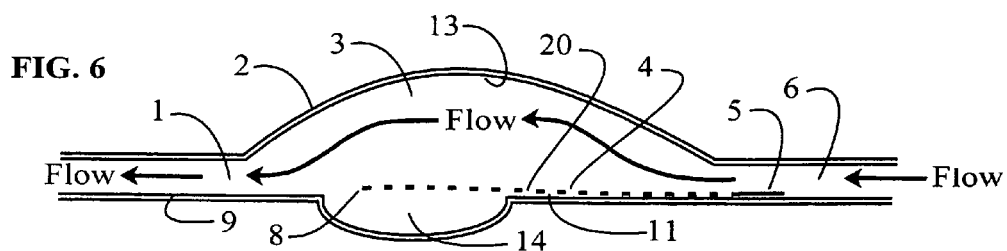
FIG. 6 is a longitudinal side view showing the relationship of an open fluid channel conducting fluid flow between the upper channel surface and flexible film device (dashes) with a concave form as a means of film device edge control.

In FIG. 6 a longitudinal side view shows the same components and functions of the biflex valve as previously described in FIG. 1 with the exception of a different form of downstream edge control means, here illustrated as a concave form 14 in the lower channel wall 9. The concave form 14 is shown as a cavity or hollow in the channel wall 9 which, like the previous convex form shown in FIG. 1-5, prevents the downstream edge 8 bottom making full sealing contact with a channel wall surface 13. This concave form 14 arrangement allows, as with the concave form 7 of FIG. 1-5, pressurized fluid access to and from the free moving bottom edge 8 and surface 11 of the film device 20.

Figure 7:
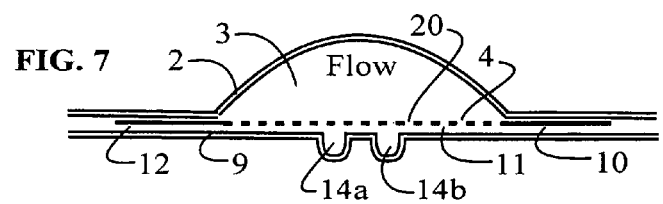
FIG. 7 is a lateral cross sectional view after FIG. 6 showing the open fluid channel created by forward fluid flow between the upper channel surface and a lower film device (dashes) with concave grooves shown as a means of film device edge control.

In FIG. 7 a lateral cross sectional view after FIG. 6 shows the open fluid channel 3 with other components previously illustrated in FIG. 2 with the exception of the concave form 7 being represented by concave form 14 being shown as concave grooves 14a/14b in the channel wall 9. These grooves and/or hollows 14a/14b, singularly or multiple, prevent the downstream edge 8 bottom from making full contact with the channel wall surface 13. Though different in design form, concave 14 and convex 7, the means is the same as pertains to facilitating film device 20 movement as motivated by pressurized fluid flow.

Figure 8:
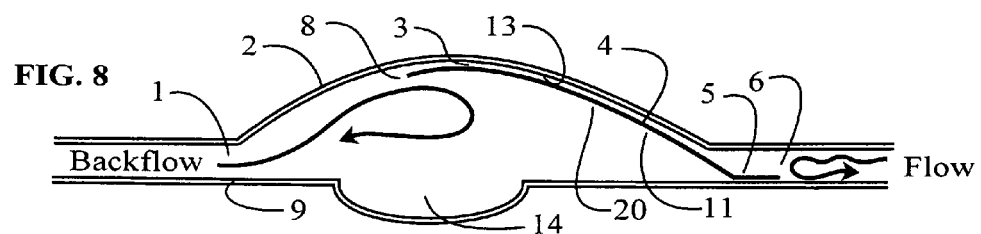
FIG. 8 is a longitudinal side view showing the closed fluid channel when film device (solid) has seated with upper channel wall when downstream edge has moved up to seal fluid channel due to concave grooves control of backflow fluid motive forces.

In FIG. 8 a longitudinal side view shows the same arrangement of components as FIG. 6 except the pressurized fluid flow has reversed to become backflow. Manipulation of the film device 20 by pressure in the same as previously described for FIG. 3 except the concave form 14 used here is substituted for the convex form 7 described in FIG. 1-5.

Figure 9:
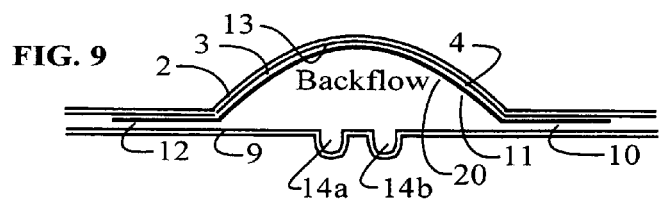
FIG. 9 is a lateral cross sectional view after FIG. 8 showing the closed fluid channel where the film device (solid) has sealed with upper channel surface.

In FIG. 9 a lateral cross sectional view after FIG. 8 shows the closed fluid channel 3 as previously described in FIG. 4. Concave form 14 is shown as grooves 14*a*/14*b* in the lower channel wall 9.

Figure 10:
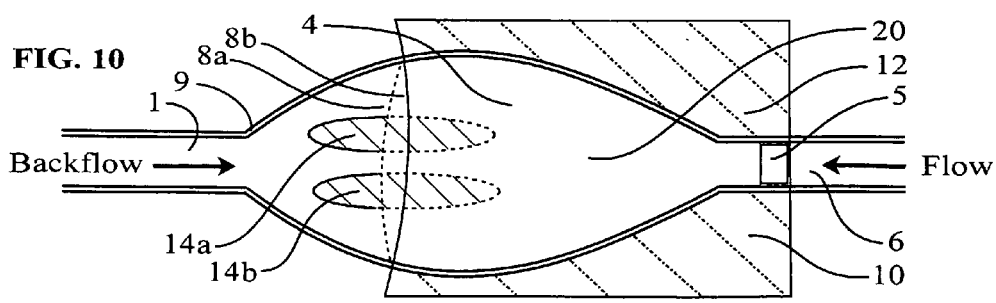
FIG. 10 is a top cross sectional view after FIGS. 6-9 showing the open location of the downstream edge of the film device (dashes) and it's the closed downstream edge (solid) position together with the relative locations of the concave grooves, fluid channel and fluid movement directions.

In FIG. 10 a top cross sectional view after FIG. 6-9 shows an arrangement of the significant parts as previously described regarding FIG. 5 except here the concave form 14 is shown as grooves 14*a*/14*b* in the lower channel wall 9 which allows pressurized fluid access to the downstream edge 8*a* bottom to facilitate edge movement in response to pressurized fluid flow.

Asymmetric Form Example

Figure 11:
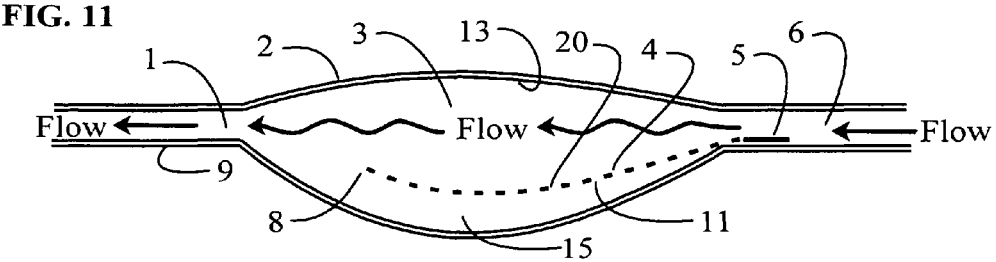
FIG. 11 is a longitudinal side view showing the relationship of an open fluid channel conducting fluid flow between the upper channel surface and flexible film device (dashes) with an asymmetric form as a means of film device edge control.

In FIG. 11 a longitudinal side view shows the same components and functions of the biflex valve as previously described in FIG. 1 with the exception of a different form of downstream edge control means, here illustrated as an asymmetrical form 15 where the downstream edge 8 of the film device 20 freely moving in the fluid channel 3 is able to respond to pressurized fluid flow with sufficient play to reach the upper channel wall 2 where it can effect a seal so as to block the fluid channel but not having sufficient play to reach the lower channel wall 9 thus leaving a gap where pressurized fluid flow can affect the downstream edge 8 bottom. Essentially, the downstream edge is placed off-axis to the center of the fluid passage formed by the channel walls 2/9 with an upper channel wall 2 bias sufficient to reach that upper channel wall 2 and by this asymmetric placement insufficient to reach the lower channel wall 9.

Figure 12:
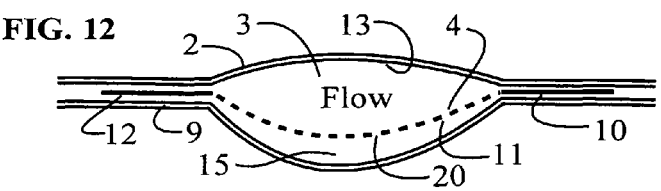
FIG. 12 is a lateral cross sectional view after FIG. 11 showing the open fluid channel created by forward fluid flow between the upper channel surface and a lower film device (dashes) with an asymmetric channel as a means of film device edge control.

In FIG. 12 a lateral cross sectional view after FIG. 11 shows the open fluid channel 3 with the components previously illustrated in FIG. 2 and FIG. 7 with the exception of the asymmetrical form 15 being depicted as the downstream edge control means. Shown is the downstream edge (dashes) of the film device 20 held by affixed side edges 10/12 so as to be suspended in the fluid channel 3 with sufficient movement (play) to reach the upper channel wall 2 so as to close the fluid channel 3 but insufficient mobility to reach the lower channel wall 9 and thus leaving a permanent opening to allow pressurized fluid flow to affect the downstream edge 8 bottom so as to affect movement.

Figure 13:
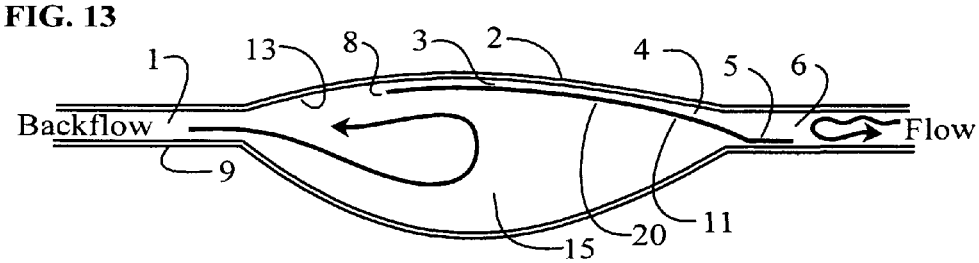
FIG. 13 is a longitudinal side view showing the closed fluid channel when film device (solid) has seated with upper channel wall when downstream edge has moved up to seal fluid channel due to an asymmetric channel control of backflow fluid motive forces.

In FIG. 13 a longitudinal cross sectional view after FIG. 11 shows the same arrangement of components except the pressurized fluid flow has reversed to become backflow. Manipulation of the film device 20 by pressure is the same as previously described for FIG. 3 except the asymmetric form 15 used here allows pressurized fluid access to the downstream edge 8 bottom without use of protrusions or cavities in the lower channel wall 9 to achieve what asymmetric edge placement can equally accomplish as a means of downstream edge control.

Figure 14:
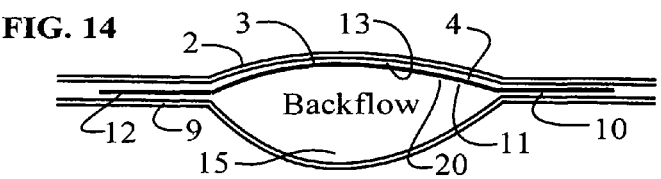
FIG. 14 is a lateral cross sectional view after FIG. 13 showing the closed fluid channel where the film device (solid) has sealed with upper channel surface.

In FIG. 14 a lateral cross sectional view after FIG. 13 shows the closed fluid channel 3 as previously described in FIG. 4. Asymmetric form 15 is shown as the greater distance to the lower channel wall 9.

Figure 15:
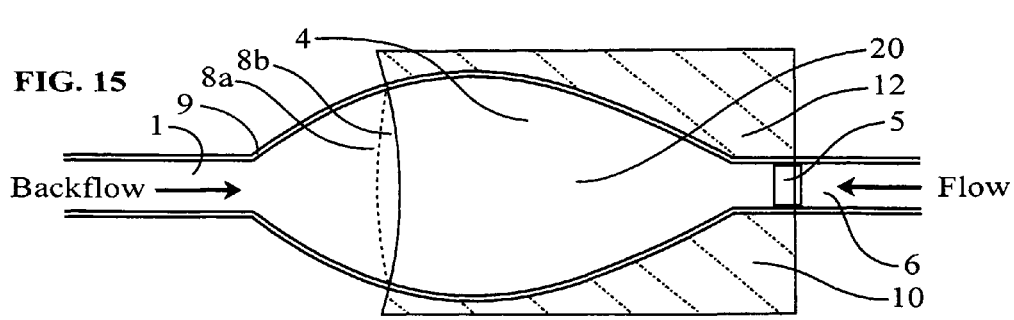
FIG. 15 is a top cross sectional view after FIGS. 11-14 showing the open location of the downstream edge of the film device (dashes) and it's the closed downstream edge (solid) position together with the relative locations of an asymmetric channel, fluid channel and fluid movement directions.

In FIG. 15 a top cross sectional view after FIG. 11-14 shows an arrangement of the significant parts as previously described regarding FIG. 5 except here the asymmetrical form 15 is not evident because it is a vertical spacial condition not capable of being clearly depicted in a top down perspective.

Wave Form Example

Figure 16:
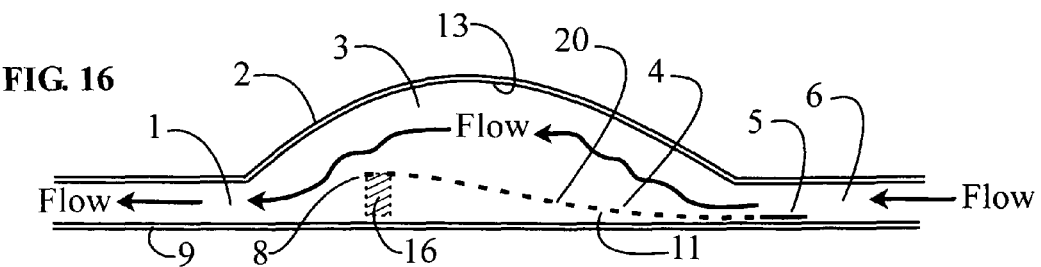
FIG. 16 is a longitudinal side view showing the relationship of an open fluid channel conducting fluid flow between the flexible film device (dashes) with a wave form of as a means of film device edge control.

In FIG. 16 a longitudinal side view shows the same components and functions of the biflex valve as previously described in FIG. 1 with the exception of a different form of downstream edge control means, here illustrated as a wave form 16 where the downstream edge 8 of the film device 20 freely moving in the fluid channel 3 has a downstream edge 8 bottom that is in the form of a wave with at least one crest and trough which prevent the edge 8 from forming a seal with the lower channel wall. Alternatively, as depicted here, the wave form 16 may be an attachment and/or construct of a device to and/or in the edge 8 bottom capable of effecting a non-sealing condition. This wave form 16 creates a permanent minimal opening which allows pressurized fluid flow to affect the downstream edge 8 bottom so as to provide the motive force for film device 20 movement.

Figure 17:
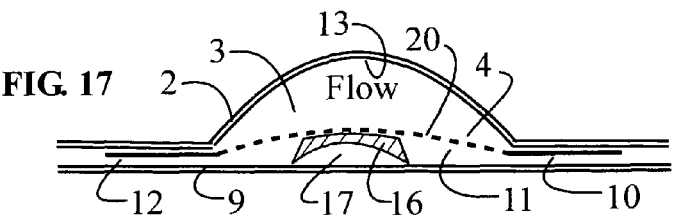
FIG. 17 is a lateral cross sectional view after FIG. 16 showing the open fluid channel created by forward fluid flow between the upper channel surface and a lower film device (dashes) with a wave channel as a means of film device edge control.

In FIG. 17 a lateral cross sectional view after FIG. 16 shows the open fluid channel 3 with the components previously illustrated in FIGS. 2, 7, 12 with the exception of the wave form 16 being depicted as the downstream edge control means where a portion of a permanent minimal opening is specifically designated as a wave channel 17. This wave channel 17 is created by the wave form 16 preventing the downstream edge 8 bottom from full contact with a lower channel wall 9.

Figure 18:
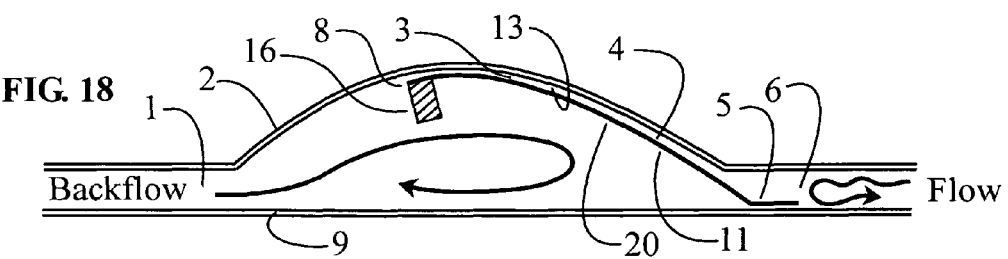
FIG. 18 is a longitudinal side view showing the closed fluid channel when film device (solid) has seated with upper channel wall when downstream edge has moved up to seal fluid channel due to wave channel control of backflow fluid motive forces.

In FIG. 18 a longitudinal cross sectional view after FIG. 16 shows the same arrangement of components except the pressurized fluid flow has reversed to become backflow. Manipulation of the film device 20 is the same as previously described in FIG. 3 except the wave form 16 used here allows pressurized fluid access to the downstream edge 8 bottom without use of channel wall protrusions or cavities or the off-axis placement of the downstream edge 8. Here the downstream edge control means resides in the wave form 16 as being part of the film device 20 itself.

Figure 19:
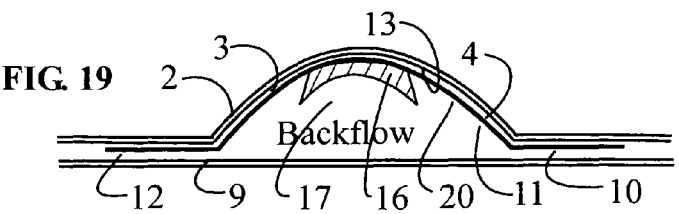
FIG. 19 is a lateral cross sectional view after FIG. 18 showing the closed fluid channel where the film device (solid) has sealed with upper channel surface.

In FIG. 19 a lateral cross sectional view after FIG. 18 shows the closed fluid channel 3 as previously described in FIG. 4. A wave form 16 is shown as having moved with the film device 20 to a sealing arrangement with the upper channel wall 2 and a correspondingly enlarged wave channel 17 opening.

Restraint Form Example

Figure 20:
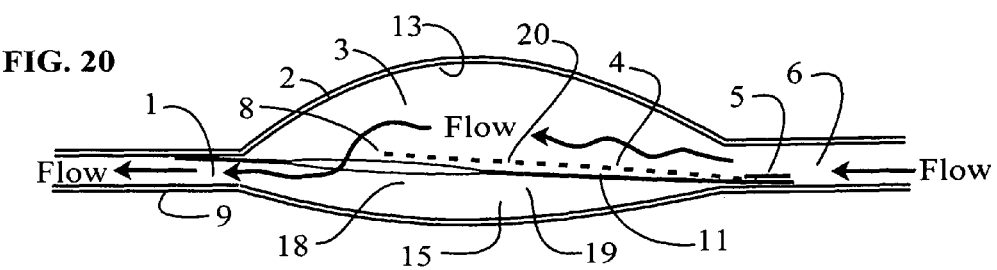
FIG. 20 is a longitudinal side view showing the relationship of an open fluid channel conducting fluid flow between the upper channel surface and flexible film device (dashes) with a restraint form as a means of film device edge control.

In FIG. 20 a longitudinal side view shows the same components and functions of the biflex valve as previously described in FIG. 1 with the exception of a different form of downstream edge control means, here illustrated as a restraint form 18 where the downstream edge 8 of the film device 20 freely moving in the fluid channel 3 has the downstream edge blocked by a restraint device 19 which prevents the edge 8 from moving closer than a fixed distance toward the lower channel wall 9 and thus preventing the edge 8 from forming a sealing condition with the lower channel wall 9. The restraint device 19 does not prevent the edge 8 moving toward and sealing with the opposite upper channel wall 2 when motivated to move by a specific type of pressurized fluid motion described as backflow.

Figure 21:
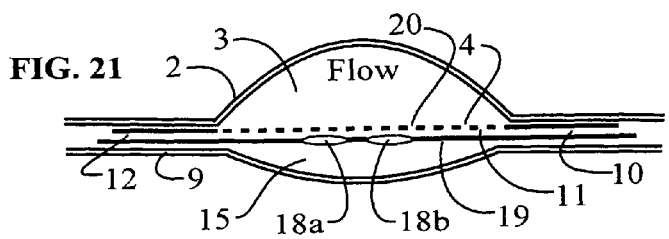
FIG. 21 is a lateral cross sectional view after FIG. 20 showing the open fluid channel created by forward fluid flow between the upper channel surface and a lower film device (dashes) with restraint openings as a means of film device edge control.

In FIG. 21 a lateral cross sectional view after FIG. 20 shows the open fluid channel 3 with the components previously illustrated in FIGS. 2, 7, 12, 17 with the exception of the restraint form 18, here shown as two openings 18*a*/18*b* in a restraint device 19 strung across the fluid passage in a manner to restrict movement of the downstream edge 8 toward and full contact with the lower channel wall 9. The restriction of the movement of the edge 8 of the film device 20 creates a permanent gap as a channel 15 between the film device edge 8 and the lower channel wall 9 in that the restraint device 19 restricts movement in this direction.

Figure 22:
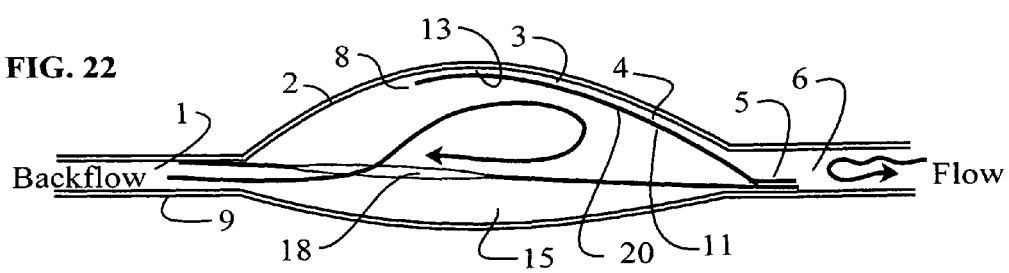
FIG. 22 is a longitudinal side view showing the closed fluid channel when film device (solid) has seated with upper channel wall when downstream edge has moved up to seal fluid channel due to restraint openings control of backflow fluid motive forces.

In FIG. 22 a longitudinal cross sectional view after FIG. 20 shows the same arrangement of components except the pressurized fluid flow has reversed to become backflow. Manipulation of the film device 20 is the same as previously described in FIG. 3 except the restraint form 18 used here allows pressurized fluid access to the downstream edge 8 without use of channel wall 9 protrusions or cavities, the off-axis placement of the edge, or the irregular shape of the edge 8 bottom. Here the downstream edge control means resides with a physical restraint device strung across the fluid passage in an interdictive manner here shown to extend beyond the downstream edge 8*a* so as to restrict movement of the edge 8 toward the lower channel wall 9 to prevent sealing yet allow unrestricted movement toward the upper channel wall 2 to permit sealing as shown. The structure of the restraint device can take many alternative shapes; while shown here as a film gripped by a wall seam with two openings 18*a*/18*b* the purpose of the restraint device could as well be served by a simple narrow ribbon or string strung across the fluid passage to restrict the edge 8 downward movement.

Figure 23:
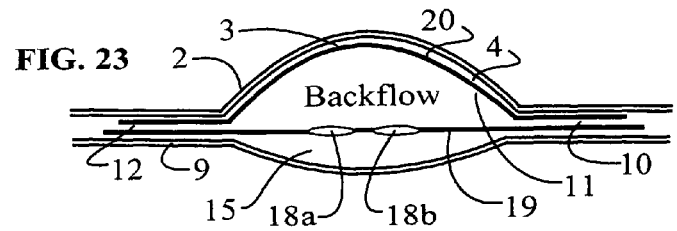
FIG. 23 is a lateral cross sectional view after FIG. 22 showing the closed fluid channel where the film device (solid) has sealed with upper channel surface.

In FIG. 23 a lateral cross sectional view after FIG. 22 shows the closed fluid channel 3 as previously described in FIG. 4. A restraint form 18 is shown as having remained in position while the film device 20 has moved to a sealing arrangement with the upper channel wall 2.

Figure 24:
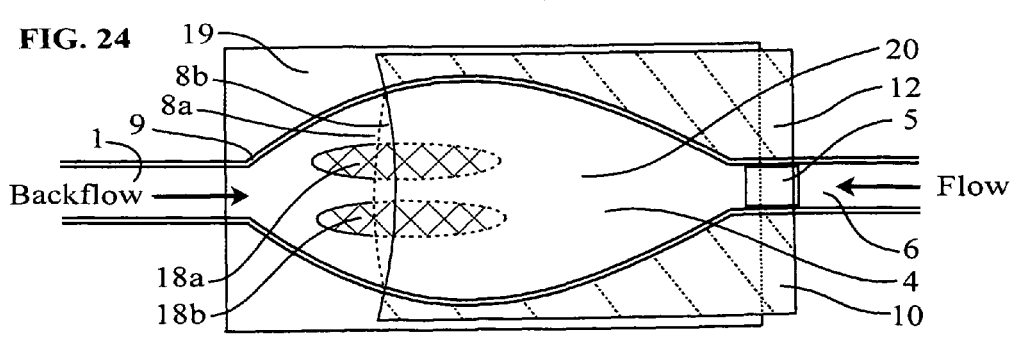
FIG. 24 is a top cross sectional view after FIGS. 20-23 showing the open location of the downstream edge of the film device (dashes) and it's the closed downstream edge (solid) position together with the relative locations of the restraint openings, fluid channel and fluid movement directions.

In FIG. 24 a top cross sectional view after FIG. 20-23 shows an arrangement of the significant parts as previously described in FIG. 5 except here the restraint form device 19, shown with two openings 18*a*/18*b*, arrest the downstream edge position (dashes) 8*a* movement while not restricting the downstream edge closed position (solid) 8*b* movement to close the fluid channel 3.

In FIG. 1-24 the attachment means variously employed to affix the film device 20 to the channel walls 2/9 and other various devices are simply shown as being mechanically gripped. Other types of attachment contemplated include adhesives, clamps, mechanical fasteners, pressure devices, tension devices, magnetism, heat seals, chemical seals, material fusion and combinations thereof. Various compositions useful in forming the channel walls 2/9 and/or channel surfaces 13 that are contemplated include one or more firm polymers, thermoplastic moldings, resin castings, metals, glasses, ceramics, extrusions, laminates, compositions, and combinations thereof. Also disclosed in the figures, most easily seen in FIGS. 5, 10, 15, 24 top views, is that the fluid passage of the biflex valve in the vicinity of said fluid channel 3 formed by film device 20 widens laterally over upstream channel to create an enlarged cross-sectional area for fluid movement thereby alleviating material flow constriction through the fluid channel 3. Another advantage achieved by the biflex design is that the film device 20 provides a wide and/or long top surface area capable of sealing off fluid channel when pressed against channel surface 13 whereby a large top surface area facilitates channel sealing by overcoming leakage created by surface irregularities and/or trapped solid content carried by said flowable materials.

The opportunities to use biflex valves as substitutes for conventional valves in fluid manipulating devices are varied and extensive. Typically the biflex valve design could replace conventional spring-and-ball and newer cpf valves employed as exit and/or inlet valves in all manner of fluid pumps. In FIG. 25 a simple block diagram shows a schematic where labeled boxes represent a pump with a reciprocating chamber capable of drawing fluid in through a one-way inlet valve on an upstroke and expelling chamber fluid out through the one-way outlet valve on the downstroke each directional inlet/outlet check valve alternately opening and closing as required to sustain the desired directional flow as readily understood by a person skilled in the art. Biflex valves can find similar application as replacement for simple inline check valves in transfer systems conveying flowable material.

These two examples are but a few examples of biflex valve applications. Biflex valves are simple, reliable, robust, and so economical as to be of particular interest to applications concerned with production of mass market, low cost disposable products. Biflex valves open up many new design paths for controlling and moving fluids, pumps are only one category of such applications.

While these improvements have been illustrated and described with reference to certain preferred embodiments, the present invention is not limited thereto. In particular, the foregoing specification and embodiments are intended to be illustrative and are not to be taken as limiting. Thus, alternatives, such as structural or mechanical or functional equivalents, and other modifications will become apparent to those skilled in the art upon reading the foregoing descriptions.

What is claimed is:

1. A check valve, comprising:
a fluid passage defined by a channel wall forming a channel surface with downstream and upstream ends capable of containing and guiding flowable material as fluid,
a flexible film device comprising top and bottom surfaces with downstream, upstream, and side edges longitudinally positioned in and extending laterally across said fluid passage and said film device top surface capable of conforming to and sealing with said channel surface,
an attachment means capable of affixing at least said upstream edge and side edges of said film device to or in a portion of said channel wall so as to define a fluid channel wherein all said flowable material moving through said passage passes between said top surface and said channel surface and the ends of said downstream edge of said film device are affixed to parts of said channel wall so as to leave a that portion between said affixed ends of said downstream edge unattached and capable of sufficient flexibility so at least a portion of said top surface of said film device is capable of blocking contact with said channel surface; and,
a downstream edge control means capable of preventing a portion of said downstream edge bottom from contact with and effectively sealing with said channel surface and
to effectively allow pressurized downstream backflow fluid access to said bottom surface of said film device so as to move and position by means of backflow fluidic pressure as the only motive force a portion of said top surface of said film device against said channel surface and
to substantially block by sealing off said fluid channel to said downstream backflow fluid moving upstream when said backflow fluid is motivated by downstream fluidic pressure greater than upstream fluidic pressure
yet same film device unblocks and opens said fluid channel to upstream fluid flow moving downstream when said upstream fluid flow is motivated by upstream fluidic pressure greater than downstream fluidic pressure.

2. The valve of claim 1 wherein said downstream edge control means is asymmetric placement of said downstream edge within said fluid passage so as to permit all of said downstream edge top contact with a portion of said channel surface yet prevent at least a portion of said downstream edge bottom from contact with a portion of said channel surface.

3. The valve of claim 1 wherein at least one portion of said channel wall is curved and/or flat.

4. The valve of claim 1 wherein the upstream fluidic pressure necessary to open said fluid channel by moving said blocking film device to permit downstream fluid flow need only exceed the fluid pressure in said downstream channel.

5. The valve of claim 1 wherein said fluid passage in the vicinity of said fluid channel formed by said film device widens laterally over upstream channel to create an enlarged cross-sectional area for said fluid movement thereby alleviating material flow constriction through said fluid channel.

6. The valve of claim 1 wherein the motive force providing movement of said film device is fluidic pressure.

7. The valve of claim 1 wherein said film device is constructed of at least one flexible polymeric material.

8. The valve of claim 1 wherein said film device provides a wide and/or long top surface area capable of sealing off said fluid channel when pressed against said channel surface whereby a large top surface area facilitates said channel sealing by overcoming leakage created by surface irregularities and/or trapped solid content carried by said flowable materials.

9. The valve of claim 1 wherein said attachment means is selected from a group including adhesives, clamps, mechanical fasteners, pressure devices, tension devices, magnetism, heat seals, chemical seals, material fusion and combinations thereof.

10. The valve of claim 1 wherein said channel wall and/or said channel surface is comprised of one or more firm polymers, thermoplastic moldings, resin castings, metals, glasses, ceramics, extrusions, laminates, compositions, and combinations thereof.

11. The value of claim 1 wherein said valve is incorporated as an exit and/or inlet valve in a pump for moving fluid.

12. The valve of claim 1 wherein said valve is incorporated as a one-way valve in a linear transfer system conveying flowable material.

13. A method of pumping fluid, said method comprising:
incorporating the fluid control valve of claim 1 as one-way inlet and/or outlet valves of a fluid pump with inlet and outlet ports;
providing a quality of flowable material to said inlet port of said pump to be pumped through said pump to exit out said outlet port; and,
cycling said pump operationally at least once to move said flowable material through said pump whereby said flowable material is moved in from said inlet port and out from said outlet port.

14. The valve of claim 1 wherein said downstream edge control means is a convex form on said channel wall capable of preventing at least one portion of said downstream edge bottom and said bottom surface from contact with said channel surface.

15. The valve of claim 14 wherein said convex form is at least one bump and/or ridge.

16. The valve of claim 1 wherein said downstream edge control means is a concave form in said channel wall capable of preventing at least one portion of said downstream edge bottom and said bottom surface from contact with said channel surface.

17. The valve of claim 16 wherein said concave form is at least one hollow and/or groove.

18. A method of operating a valve according to claim 1, wherein said method comprises opening and closing said fluid channel by varying said upstream pressure above and below that of said downstream pressure.

19. The method of claim 18 further including the step of closing said fluid channel to prevent said downstream backflow fluid movement upstream.

20. The valve of claim 1 wherein said downstream edge control means is a wave form on or in at least a portion of said downstream edge bottom and said bottom surface capable of preventing at least one portion of said downstream edge bottom and bottom surface from contact with said channel surface.

21. The valve of claim 20 wherein said wave is at least one crest and/or trough.

22. The valve of claim 20 wherein said wave is formed in or attached to said downstream edge bottom.

23. The valve of claim 1 wherein said downstream edge control means is a restraint device positioned between a portion of said bottom surface and said channel surface so as to prevent at least a portion of said downstream edge bottom contact with said channel surface.

24. The valve of claim 23 wherein said restraint device is partially positioned between said bottom surface and said channel surface to at least extend beyond downstream edge.

25. The valve of claim 23 wherein said restraint device is attached to a portion of said channel wall.

26. A check valve, comprising:
a fluid passage containing flowable fluid material;
a flexible film device positioned within said fluid passage comprising top and bottom surfaces with downstream, upstream, and side edges longitudinally positioned in and extending laterally across said fluid passage where upstream and side edges are attached to channel surfaces and said film device to surface capable of conforming to and sealing with channel surface comprising top and bottom surfaces with downstream, upstream, and side edges longitudinally positioned in and extending laterally across said fluid passage where upstream and side edges are attached to channel surfaces and said film device top surface capable of conforming to and sealing with channel surface;
attachment of said film device in said fluid passage so as to form a closable fluid channel capable of permitting and preventing material flow through said fluid channel; and,
a downstream edge control means capable of guiding directional pressurized fluid flow as the only motive force sufficient to move said film device so as to open and close said channel to forward flow of said material yet prevent reverse material backflow through said fluid channel respectively.

* * * * *